United States Patent
Bech et al.

(10) Patent No.: US 8,876,477 B2
(45) Date of Patent: *Nov. 4, 2014

(54) WIND TURBINE AND A PITCH BEARING FOR A WIND TURBINE

(75) Inventors: Anton Bech, Ringkøbing (DK); Jesper Lykkegaard Andersen, Hornslet (DK)

(73) Assignee: Vestas Wind Systems A/S, Aarhus N. (DK)

( * ) Notice: Subject to any disclaimer, the term of this patent is extended or adjusted under 35 U.S.C. 154(b) by 727 days.

This patent is subject to a terminal disclaimer.

(21) Appl. No.: 13/071,908

(22) Filed: Mar. 25, 2011

(65) Prior Publication Data

US 2011/0236186 A1 Sep. 29, 2011

Related U.S. Application Data

(60) Provisional application No. 61/318,615, filed on Mar. 29, 2010.

(30) Foreign Application Priority Data

Mar. 29, 2010 (DK) ................................ 2010 00261

(51) Int. Cl.
| | |
|---|---|
| F01D 25/16 | (2006.01) |
| F03D 11/00 | (2006.01) |
| F03D 1/06 | (2006.01) |
| F16C 19/18 | (2006.01) |
| F16C 19/50 | (2006.01) |

(52) U.S. Cl.
CPC .......... F03D 11/0008 (2013.01); F03D 1/0658 (2013.01); F16C 19/18 (2013.01); F16C 19/505 (2013.01); F05B 2260/79 (2013.01); Y02E 10/721 (2013.01); Y02E 10/722 (2013.01)
USPC ...................................................... 416/174

(58) Field of Classification Search
USPC ............. 416/147, 149, 153, 155, 157 R, 135, 416/236, 158, 236 R, 236 A
See application file for complete search history.

(56) References Cited

U.S. PATENT DOCUMENTS 6,302,588 B1 * 10/2001 Brown .......................... 384/461
6,799,947 B2 * 10/2004 Wobben ........................ 416/174

(Continued)

FOREIGN PATENT DOCUMENTS

| DE | 103 27 641 | 1/2005 |
|---|---|---|
| DE | 102005022205 A1 | 11/2006 |

(Continued)

OTHER PUBLICATIONS

European Patent Office, The Extended European Search Report; European Application No. 11002443, 5 pgs., Jul. 22, 2011.

(Continued)

*Primary Examiner* — Edward Look
*Assistant Examiner* — Eldon Brockman
(74) *Attorney, Agent, or Firm* — Wood, Herron & Evans, LLP

(57) ABSTRACT

A wind turbine includes a rotor having at least one wind turbine blade connected to a rotor hub through at least one blade pitch bearing. The pitch bearing includes at least one outer ring, at least one center ring and at least one inner ring. The pitch bearing has a first rolling element arrangement between the outer ring and the center ring, and a second rolling element arrangement between the center ring and the inner ring, wherein at least one of the first and the second rolling element arrangements includes at least two rows of rolling elements. The at least two rows are at different axial positions in relation to a rotational axis. The play in the first row of roller elements is greater than the play in the second row of roller elements. A pitch bearing for a wind turbine is also disclosed.

15 Claims, 6 Drawing Sheets

(56) References Cited

U.S. PATENT DOCUMENTS

| | | | |
|---|---|---|---|
| 8,348,598 B2 * | 1/2013 | Watanabe | 415/131 |
| 2008/0199315 A1 * | 8/2008 | Bech | 416/61 |
| 2009/0016665 A1 | 1/2009 | Yoshida et al. | |
| 2011/0243738 A1 * | 10/2011 | Andersen | 416/147 |
| 2011/0291422 A1 * | 12/2011 | Watanabe | 290/55 |

FOREIGN PATENT DOCUMENTS

| | | |
|---|---|---|
| DE | 10 2005 026 141 | 12/2006 |
| DE | 10 2009 004 991 | 7/2010 |
| EP | 1 741 943 | 1/2007 |
| EP | 1741943 A2 | 1/2007 |
| FR | 2887034 A1 | 12/2006 |
| GB | 924443 | 4/1963 |
| WO | 2007006301 A1 | 1/2007 |
| WO | 2007112748 A2 | 10/2007 |
| WO | 2008/074322 | 6/2008 |

OTHER PUBLICATIONS

Carsten Nielsen; 1st Technical Examination Report issued in priority Denmark Application No. PA 2010 00261; Nov. 15, 2010; 4 pages; Denmark Patent and Trademark Office.

European Patent Office, Notice of Opposition issued in corresponding EP Application No. 11002443.7-1610 dated Sep. 27, 2013, 20 pages.

* cited by examiner

WIND TURBINE AND A PITCH BEARING FOR A WIND TURBINE

CROSS-REFERENCE TO RELATED APPLICATIONS

This application claims priority under 35 U.S.C. §119(a) to DK Application No. PA 2010 00261, filed Mar. 29, 2010. This application also claims the benefit of U.S. Provisional Application Ser. No. 61/318,615, filed Mar. 29, 2010. Each of these applications is incorporated by reference herein in its entirety.

TECHNICAL FIELD

The invention relates to a wind turbine comprising a rotor including at least one wind turbine blade connected to a rotor hub through at least one pitch bearing, wherein the at least one pitch bearing comprises at least one outer ring, at least one centre ring and at least one inner ring. The invention further relates to a pitch bearing for a wind turbine.

BACKGROUND

A wind turbine known in the art comprises a wind turbine tower and a wind turbine nacelle positioned on top of the tower. A wind turbine rotor with three wind turbine blades is connected to the nacelle through a low speed shaft, as illustrated on FIG. 1.

Modern wind turbines control the load on the rotor by pitching the blades in and out of the incoming wind. The blades are pitched to optimize the output or to protect the wind turbine from damaging overloads.

To perform the pitch, each blade is provided with a pitching arrangement comprising a pitch bearing between the hub and the blade, and some sort of mechanism, most often a hydraulic cylinder or an electrical motor, to provide the force for pitching the blade and maintaining it in a given position. This pitching arrangement typically enables each blade to be turned at least 60° around their longitudinal axis.

As the size of the modern wind turbines increases, the load, on most of the different parts which a wind turbine consists of, also increases. Notably, the loads on the pitching arrangement are significantly increased due to increased blade size and overall power output of the wind turbine.

From European patent application EP 1 741 943 A2 it is therefore known to use a three ring bearing as a wind turbine bearing. However, the inner and outer rings of a three ring bearing have a tendency to deflect outwards and away from the centre ring when the bearing is subject to large axial loads. When the inner and outer rings is fixed, for example, against the rotor hub at a bottom end of the rings, the upper ends of the rings will deflect more than the bottom ends. Three ring bearings are usually provided with at least two rows of rolling elements between the centre ring and a first ring of the outer and the inner ring, and at least one row of rolling elements between the centre ring and the second ring of the outer and the inner ring. This ensures that the large axial loads are transferred between the rings by means of as many contact surfaces as possible given weight, financial and manufacturing considerations. But, if one end of the bearing rings deflects more than the other, the loads are not distributed evenly between the at least two rows of rolling elements. That is, the heavier the bearing is loaded, the more uneven the loads are distributed between the at least two rows of rolling elements.

In EP 1 741 943 A2, a solution to this problem is postulated and includes supporting the outer ring near its contact surface by means of a supporting part or by reinforcing the outer ring by increasing the thickness of the ring the further away from the contact surface it extends. However, supporting the outer ring requires a close fit with the supporting part thereby increasing the manufacturing cost of both the outer ring and the supporting part and such a solution makes it considerably more difficult to mount and dismount the bearing. Moreover, reinforcing the rings to compensate for the tendency to deflect increases both the weight and the cost of the ring considerably.

Accordingly, an aspect of the invention is to provide a wind turbine pitch bearing design with an improved load distribution.

SUMMARY

An embodiment of the invention provides for a wind turbine comprising a rotor including at least one wind turbine blade connected to a rotor hub through at least one blade pitch bearing. The at least one pitch bearing comprises at least one outer ring, at least one centre ring, and at least one inner ring. The pitch bearing further comprises a first rolling element arrangement arranged between the at least one outer ring and the at least one centre ring and a second rolling element arrangement arranged between the at least one centre ring and the at least one inner ring, wherein at least one of the first and the second rolling element arrangements comprises at least two rows of rolling elements.

The at least two rows of rolling elements are arranged at different axial positions in relation to an axis of rotation of the pitch bearing so that a first row of the at least two rows of rolling elements is arranged closer to the wind turbine part to which the inner ring and the outer ring are connected, and a second row of the at least two rows of rolling elements is arranged closer to the wind turbine part to which the centre ring is connected. The play of the rolling elements in the first row of rolling elements is greater than the play of the rolling elements in the second row of rolling elements.

The outer and inner ring will deflect more the further away from the part to which they are attached the rings extend. When the bearing is loaded at nominal load, i.e., the load it is subject to during normal operation of the wind turbine. This means that the row closest to the second part will not transfer as much or any load in a traditional three ring pitch bearing. However, by providing the row closest to a first part of the blade and the hub to which the inner and the outer ring is attached with greater play than the row closest to a second part of the blade and the hub to which the centre ring is attached when the pitch bearing is not loaded at less than nominal load, it is possible to compensate for or balance the deflection in that the row closest to a first part, initially comprising the greatest play, will be more loaded the more the bearing is loaded, thereby allowing the load to be more evenly distributed between the two rows when the bearing reaches its nominal load.

It should be noted that the line "wherein at least one of the first and the second rolling element arrangements comprises at least two rows of rolling elements" in this context covers embodiments where the first rolling element arrangement comprises two or more rows of rolling elements, where the second rolling element arrangement comprises two or more rows of rolling elements, or where both the first and the second rolling element arrangements comprises two or more rows of rolling elements. But even if both the first and the second rolling element arrangements comprises two or more rows of rolling elements, only one has to include a first row with greater play than the second row of rolling elements.

That is, a three ring pitch bearing comprising two rows of rolling elements in both the first and the second rolling element arrangements would also be covered by embodiments of the invention even if only the first or the second rolling element arrangement comprises rows of different play.

Even further, it should be noted that both the terms "the wind turbine part, to which the inner ring and the outer ring are connected" and "the wind turbine part to which the centre ring is connected" includes both that the bearing rings are fixed directly against the respective wind turbine parts, i.e., the hub or the blade, or that the bearing rings are fixed indirectly against the respective wind turbine parts through some intermediate additional part formed separate from both the bearing and the respective wind turbine part.

In an aspect of the invention, a first row rolling element race at the first row is of the same size as a second row rolling element race at the second row and wherein the greater play is enabled by forming the rolling elements of the first row smaller than the rolling elements of the second row.

Providing the greater initial play of the first row by making the rolling elements of the first row slightly smaller than the rolling elements of the second row, and maintaining the races of both the first and the second row at the same size, is advantageous in that it will only require that the rolling elements of the first row are made to a different tolerance than the rolling elements of the second row, which provides for a cost-efficient bearing.

In an aspect of the invention, the rolling elements of the first row are of the same size as the rolling elements of the second row and wherein the greater play is enabled by forming a first row rolling element race at the first row greater than a second row rolling element race at the second row.

Providing the greater initial play of the first row by making the rolling element race of the first row bigger smaller than the rolling element race of the second row, and maintaining the rolling elements of both the first and the second row at the same size, is advantageous in that if all the rolling elements are of the same size, the assembly of the pitch bearing becomes considerably easier thereby reducing the cost of the bearing.

In an aspect of the invention, the rolling elements of the first row are smaller than the rolling elements of the second row and wherein a first row rolling element race at the first row is greater than a second row rolling element race at the second row.

Thereby is achieved an advantageous embodiment of the invention.

In an aspect of the invention, the outer ring comprises an outer ring contact surface being fixed towards a corresponding outer ring hub contact surface of the hub and the inner ring comprises an inner ring contact surface being fixed towards a corresponding inner ring hub contact surface of the hub.

Thereby is achieved an advantageous embodiment of the invention.

In an aspect of the invention, the centre ring comprises a centre ring contact surface being fixed towards a corresponding centre ring blade contact surface of the blade.

Thereby is achieved an advantageous embodiment of the invention.

In an aspect of the invention, the first rolling element arrangement is arranged further away from the axis of rotation of the pitch bearing than the second rolling element arrangement.

Thereby is achieved an advantageous embodiment of the invention.

In an aspect of the invention, the at least one centre ring comprises a bottom surface and a bottom surface plane, wherein the bottom surface plane is perpendicular to an axis of rotation of the pitch bearing and extending through the bottom surface, wherein the first row of the at least two separate rows of rolling elements is arranged at a first row distance from the bottom surface plane, and wherein the inner ring and/or the outer ring further comprises a support part including a support face substantially facing the centre ring and including a back face substantially facing away from the centre ring, wherein the at least two separate rows of rolling elements are supported against the support face and wherein a contact surface part protrudes from the back face, wherein the contact surface part includes a contact face substantially facing in a general axial direction towards the wind turbine part to which the inner ring and the outer ring are connected, wherein the contact face is fixed towards a corresponding hub contact surface or a corresponding blade contact surface, and wherein the contact face is arranged at a contact face distance from the bottom surface plane and wherein the first row distance is smaller than the contact face distance.

Providing the support part with a contact surface part is advantageous in that it increases the rigidity of the bearing ring locally, thereby allowing the local deflection rate of the bearing ring to be better controlled.

Furthermore, positioning the contact surface part on the support part so that the contact face of the contact surface part is further away from the bottom surface plane than the first row of rolling elements is advantageous in that this bearing ring design ensures that the support part is more flexible at the first row of rolling elements than the second row of rolling elements, thereby allowing that the bearing ring to be more easily deflected at the first row of rolling elements so that the deflection explained previously in relation to prior art pitch bearings, is better balanced thereby ensuring a better load distribution between the two rows of rolling elements.

Even further, providing the bearing ring fixation in the contact surface part protruding from the back side of the support is also advantageous in that it allows the bearing ring fixation to be moved further away from the rows of rolling elements so that the bearing fixation has less of an influence on the bearing deflection, and it is easier to control the deflection of the bearing ring by means of its rigidity.

In an aspect of the invention, the support part extends into a depression of the hub or the blade.

Making the support part extend into a depression is advantageous in that it is thereby possible to allow for a more free and controlled deflection of the support part at the first row of rolling elements.

The invention further provides for a pitch bearing for a wind turbine, wherein the pitch bearing comprises at least one outer ring, at least one centre ring including a bottom surface and a bottom surface plane, wherein the bottom surface plane is perpendicular to an axis of rotation of the pitch bearing and extends through the bottom surface, and at least one inner ring.

The pitch bearing further comprising a first rolling element arrangement arranged between the at least one outer ring and the at least one centre ring and a second rolling element arrangement arranged between the at least one centre ring and the at least one inner ring, wherein at least one of the first and the second rolling element arrangements comprises at least two rows of rolling elements.

The at least two rows of rolling elements are arranged at different axial positions in relation to an axis of rotation of the pitch bearing so that a first row of the at least two rows of rolling elements is arranged closer to the bottom surface plane than a second row of the at least two rows of rolling elements, and wherein the play of the rolling elements in the first row of rolling elements is greater than the play of the rolling elements in the second row of rolling elements.

The more the outer ring and the inner ring deflect outwards, the more the load will be transferred by only the first row in a traditional pitch bearing, which is disadvantageous in that the more the bearing is loaded, the more unevenly the load is distributed between the two or more rows. Therefore, by providing the bearing with an initial greater play at the first row, the load will become better distributed the more the bearing is loaded, which is advantageous in that the rolling elements can handle an uneven load distribution better at a small load than at a heavy load.

In an aspect of the invention, the centre ring comprises a centre ring contact surface adapted for being fixed against a corresponding first wind turbine part and wherein the centre ring contact surface is arranged at the end of the centre ring in the general axial direction opposite the bottom surface plane, and wherein the inner ring comprises an inner ring contact surface adapted for being fixed against a corresponding second wind turbine part and wherein the outer ring comprises an outer ring contact surface also adapted for being fixed against the corresponding second wind turbine part and wherein the inner ring contact surface and the outer ring contact surface are arranged at the end of the rings in the general axial direction of the bottom surface plane.

Thereby is achieved an advantageous embodiment of the invention.

In an aspect of the invention, the first row of the at least two separate rows of rolling elements is arranged at a first row distance from the bottom surface plane, and wherein the inner ring and/or the outer ring further comprises a support part including a support face substantially facing the centre ring and including a back face substantially facing away from the centre ring, wherein the at least two separate rows of rolling elements are supported against the support face and wherein a contact surface part protrudes from said back face, wherein the contact surface part includes a contact face substantially facing in a general axial direction towards bottom surface plane, wherein the contact face is arranged at a contact face distance from the bottom surface plane and wherein the first row distance is smaller than the contact face distance.

BRIEF DESCRIPTION OF THE DRAWINGS

The invention will be described in the following with reference to the figures in which.

DETAILED DESCRIPTION

Figure 1:
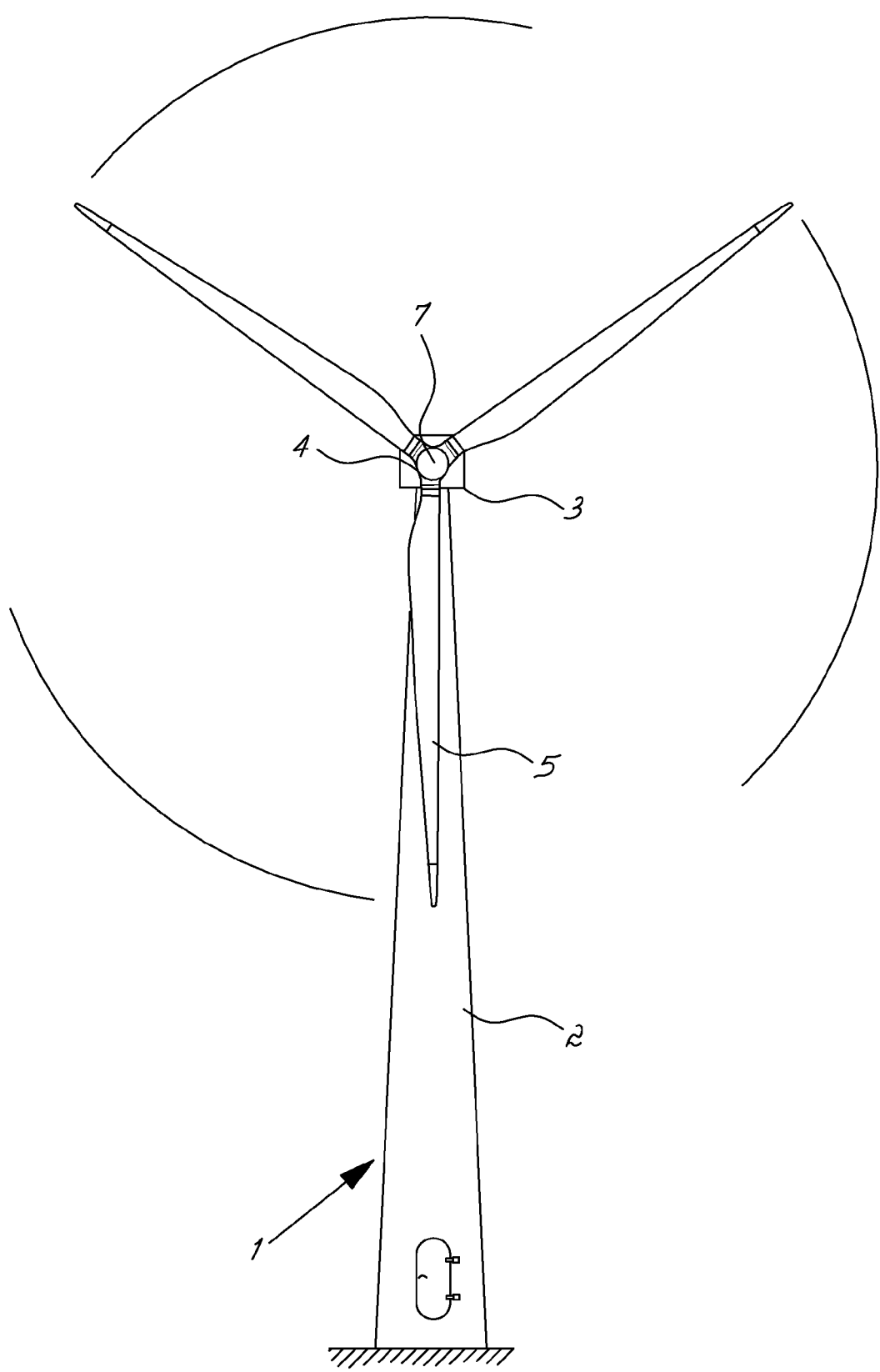
FIG. 1 illustrates a large modern wind turbine as seen from the front.

FIG. 1 illustrates a wind turbine 1, comprising a tower 2 and a wind turbine nacelle 3 positioned on top of the tower 2. The wind turbine rotor 4, comprising three wind turbine blades 5, is connected to the nacelle 3 through the low speed shaft which extends out of the nacelle 3 front.

Figure 2:
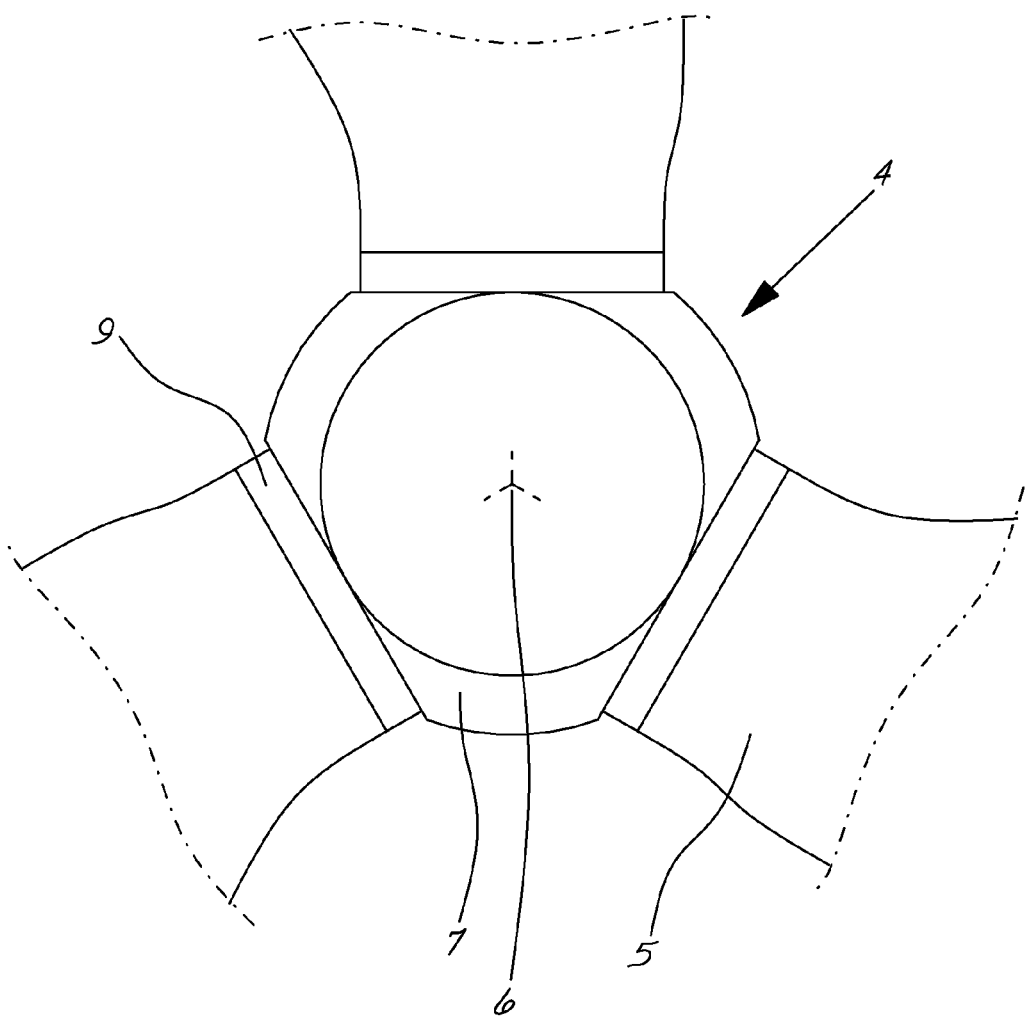
FIG. 2 illustrates a wind turbine hub comprising three blades as seen from the front.

FIG. 2 illustrates a wind turbine rotor 4 comprising a hub 7 and three blades 5 as seen from the front.

The pitch bearings 9 have to transfer forces mainly from three different sources. The blade 5 (and the bearings 9 themselves) is under the constant influence of the force of gravitation. The direction of the gravitational force varies depending on the blades position, inducing different loads on the pitch bearings 9. When the blade is in motion, the bearings 9 are also under the influence of a centrifugal force, which mainly produces an axial pull in the bearings 9. Finally, the bearings 9 are under the influence of the wind load on the blades 5. This force is by far the greatest load on the bearings 9 and it produces a massive moment, which the bearings 9 have to stand.

The load on and from all the pitch bearings 9 has to be transferred to the hub 7 and further into the rest of the wind turbine 1. This fact makes the load transferring between the pitch bearings 9 and the hub 7 very crucial, especially when the loads get higher due to larger blades and increased power output.

In this embodiment of the invention, the rotor 4 comprises three blades 5 but in another embodiment, the rotor 4 could comprise one, two, four or more blades 5. Each blade 5 is connected to the hub 7 through a pitch bearing 9 enabling the blade 5 to turn around its longitudinal axis.

At the centre of the hub 7 is illustrated the rotors axis of rotation 6 around which the entire rotor 4 rotates.

Figure 3:
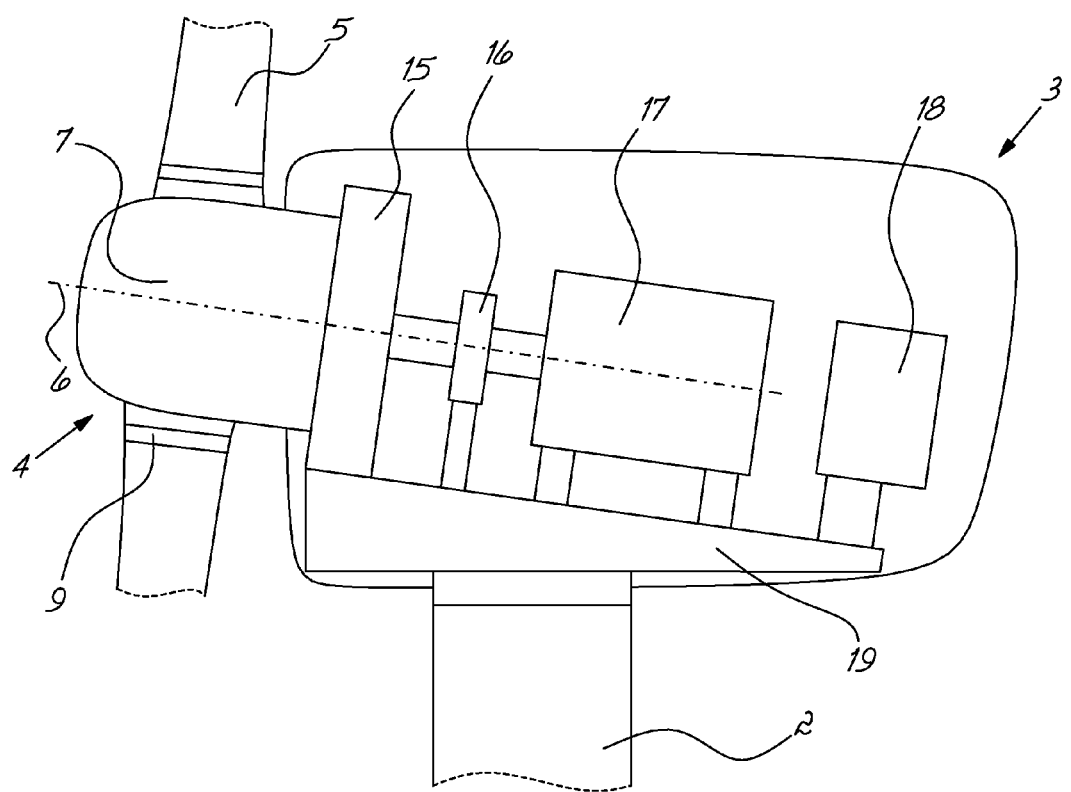
FIG. 3 illustrates a simplified cross section of a nacelle, as seen from the side.

FIG. 3 illustrates a simplified cross section of a nacelle 3 of a prior art wind turbine 1, as seen from the side. Nacelles 3 exists in a multitude of variations and configurations, but in most cases the drive train in the nacelle 3 almost always comprise one or more of the following components: a gearbox 15, a coupling (not shown), some sort of breaking system 16 and a generator 17. A nacelle 3 of a modern wind turbine 1 can also include a converter 18 (also called an inverter) and additional peripheral equipment such as further power handling equipment, control cabinets, hydraulic systems, cooling systems and more.

The weight of the entire nacelle 3 including the nacelle components 15, 16, 17, 18 is carried by a nacelle structure 19. The components 15, 16, 17, 18 are usually placed on and/or connected to this common load carrying nacelle structure 19. In this simplified embodiment, the load carrying nacelle structure 19 only extends along the bottom of the nacelle 3, for example, in form of a bed frame to which some or all the components 15, 16, 17, 18 are connected. In another embodiment, the load carrying structure 19 could comprise a gear bell, which through a main bearing (not shown) could transfer the load of the rotor 4 to the tower 2. Alternatively, the load carrying structure 19 could comprise several interconnected parts such as latticework.

In this embodiment, the blades 5 of the wind turbine rotor 4 are connected to the hub 6 through pitch bearings 9, thereby allowing that the blades 5 to rotate around their longitudinal axis.

The pitch angle of the blades 5 could then, for example, be controlled by linear actuators, stepper motors or other means for rotating the blades 5 (not shown) connected to the hub 6 and the respective blade 5.

Figure 4:
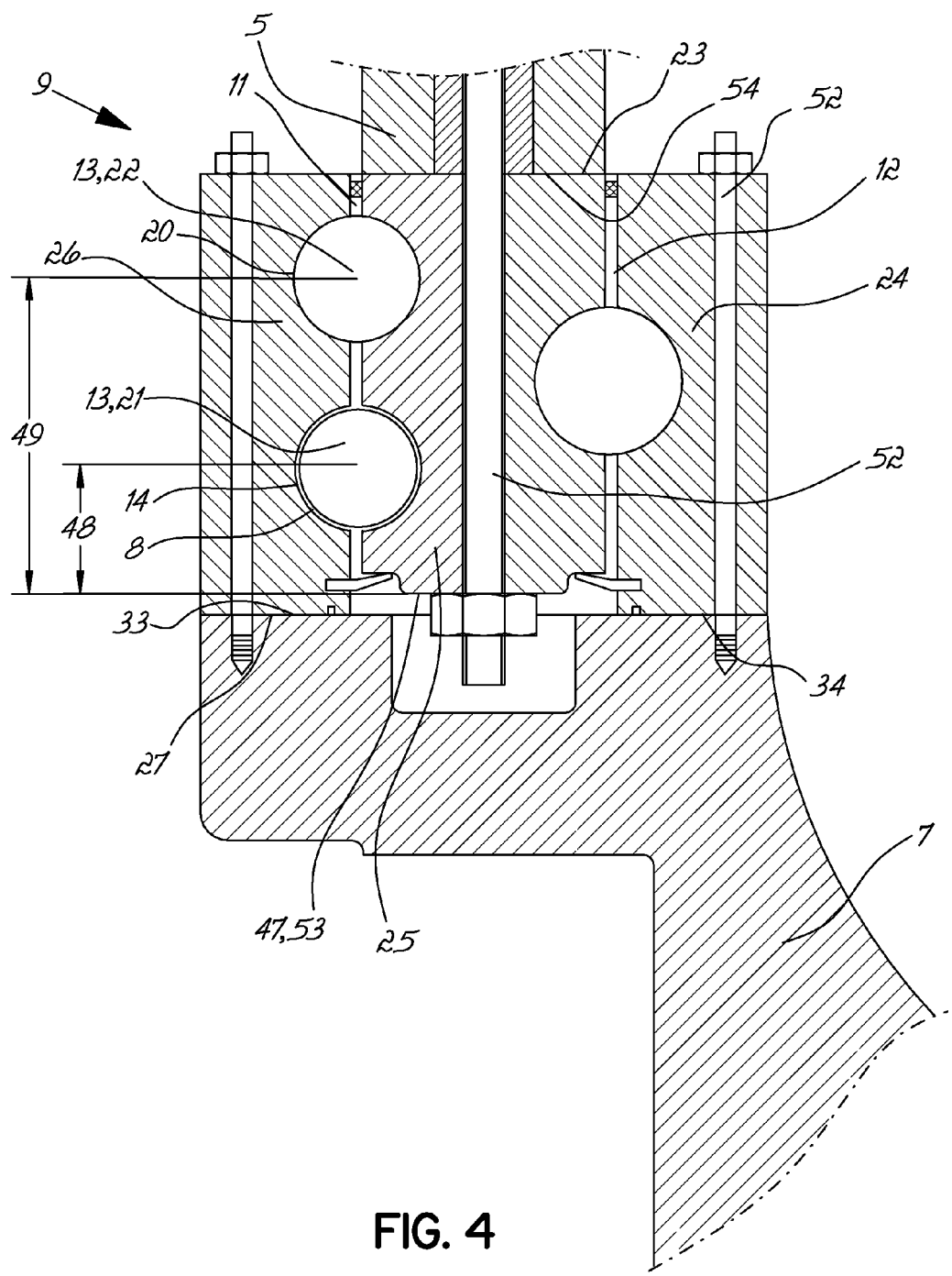
FIG. 4 illustrates a cross section of one side of a first embodiment of a pitch bearing comprising three rows of rolling elements.

FIG. 4 illustrates a cross section of one side of a first embodiment of a pitch bearing 9 comprising three rows of rolling elements 13.

In this embodiment, the outer ring 24 and the inner ring 26 are both connected directly to the hub 7 in that an outer ring contact surface 27 is fixed directly against a hub contact surface 33 and that an inner ring contact surface 34 is also fixed directly against the hub contact surface 33 by means of connection means 52. The centre ring is connected to the blade 5 in that a centre ring contact surface 23 is fixed directly against a blade contact surface 54. However, in another embodiment of the invention, the pitch bearing 9 could be flipped 180° so that the inner ring 26 and the outer ring 24 are connected to the blade 5 either directly or through a connection member (not shown), and the centre ring 25 is connected to the hub 7 either directly or through a connection member (not shown).

In this embodiment, all the contact faces 23, 27, 33, 34, 54 are even and level surfaces. But in another embodiment, one, two, three, four or more of the surfaces 23, 27, 33, 34, 54 could be sloped, curved or, for example, comprise matching protrusions and grooves, for example, to guide the bearing 9 or to centre the bearing 7 in relation to the hub 7 and/or the blade 5.

In this embodiment of the invention, all the bearing contact surfaces 23, 27, 34 are fixed directly against hub contact surface 33 or the blade contact surface 54. But in another embodiment, one or more washers, a distance piece, vibrations dampers or other could be provided between one or more of the bearing contact surfaces 23, 27, 34 and the hub contact surface 33 or the blade contact surface 54. In any event, the connection means 52 would ensure that the bearing contact surfaces 23, 27, 34 are fixed towards the hub contact surface 33 and/or the blade contact surface 54.

In this embodiment of the invention, the connection means 52 are all stud bolts. But in another embodiment of the invention, however, the connection means 52 could be screws, rivets, bolts or any other kind of connectors suited for connecting pitch bearing rings 24, 25, 26 to wind turbine parts 5, 7.

The pitch bearings 9 allows the centre ring 25 to rotate around the pitch bearings axis of rotation 10 in relation the inner 26 and outer ring 24 so that the blades 5 are also turned.

In this embodiment of the invention, the pitch bearing 9 comprises a first rolling element arrangement 11 arranged between the centre ring 25 and the outer ring 24 and comprises two separate rows 21, 22 of rolling elements 13. But in another embodiment, the first rolling element arrangement 11 could comprise three, four or more rows of rolling elements 13.

The pitch bearing 9 is also provided with a second rolling element arrangement 12 comprising only one row of rolling elements 13. But in another embodiment, the second rolling element arrangement 12 could include two, three, four or more rows of rolling elements 13.

In this embodiment of the invention, the first row of rolling elements 21 of the first rolling element arrangement 11 are made with greater play 8 than the second row of rolling elements 22 of the first rolling element arrangement 11. In this embodiment, this is done by forming the races of the first and second row substantially identically, and by making the balls of the first row 21 at a slighter smaller diameter than the balls of the second row 22.

In another embodiment of the invention, greater play 55 could also be achieved by forming the rolling elements identically and then making the race 14 of the first row 21 slightly larger than the race 20 of the second row 22.

In this embodiment of the invention, a bottom surface plane 53 is perpendicular to the pitch bearing axis of rotation 10 and extends through the bottom surface 47 of the centre ring 25. In this embodiment, the entire bottom surface 47 also extends perpendicular to the pitch bearing axis of rotation 10, making the bottom surface plane 53 extend through the entire bottom surface 47. However, in another embodiment of the invention, the bottom surface 47 could be slanting, rounded, curved or in another way be other than completely parallel with the bottom surface plane 53. In such cases, the axial location of the bottom surface plane 53 is defined by the extreme point of the bottom surface 47, i.e., the point of the bottom surface 47 which extends furthest in the given axial direction.

In this embodiment, the first row 21 of the first rolling element arrangement 11 is arranged at a first row distance 48 from the bottom surface plane 53, and the second row 22 of rolling elements 13 is arranged at a second row distance 27 from the bottom surface plane 53 so that the first row 21 is closer to the bottom surface plane 53 than the second row 22.

Figure 5:
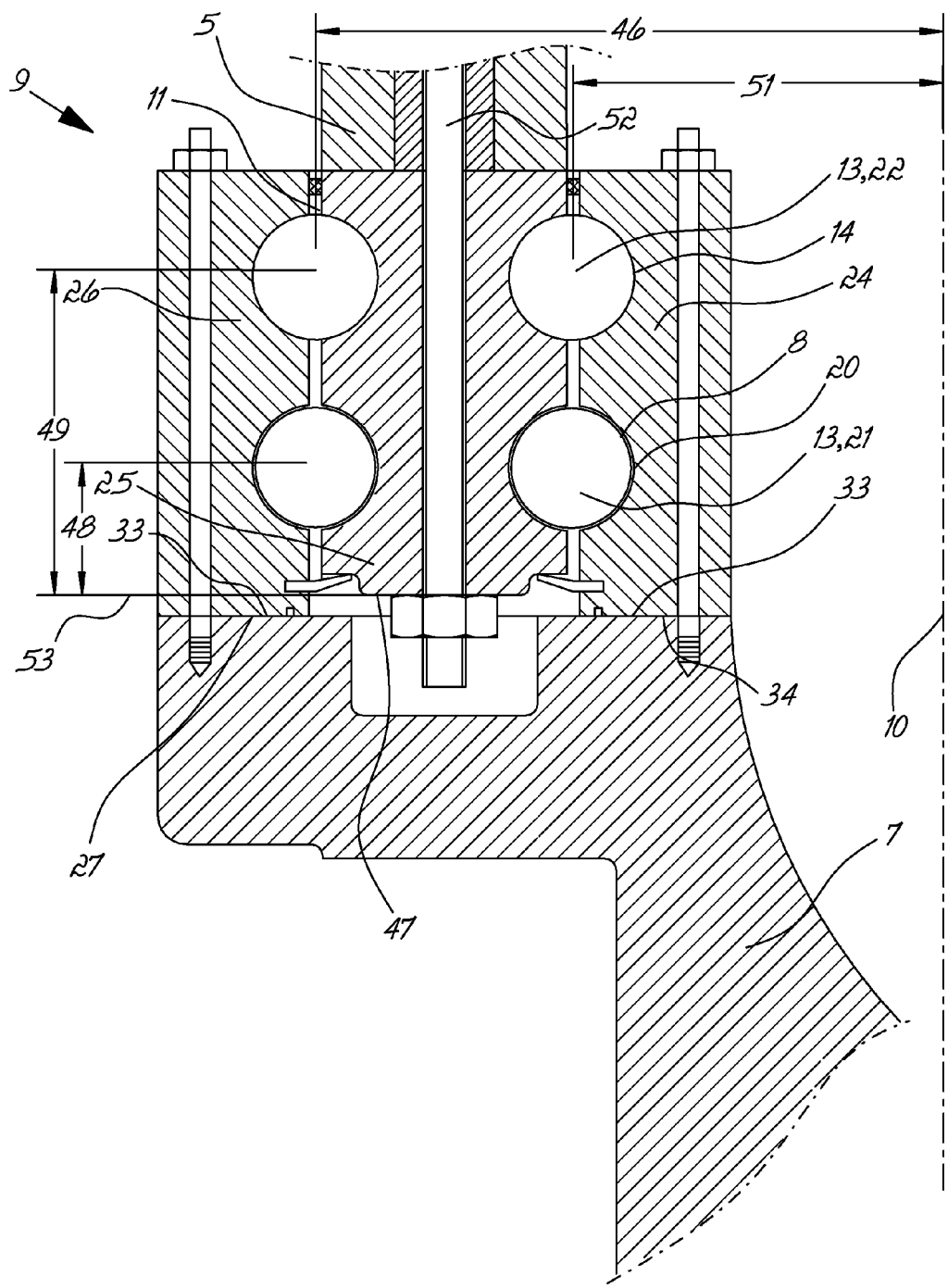
FIG. 5 illustrates a cross section of one side of a second embodiment of a pitch bearing comprising four rows of rolling elements.
Figure 6:
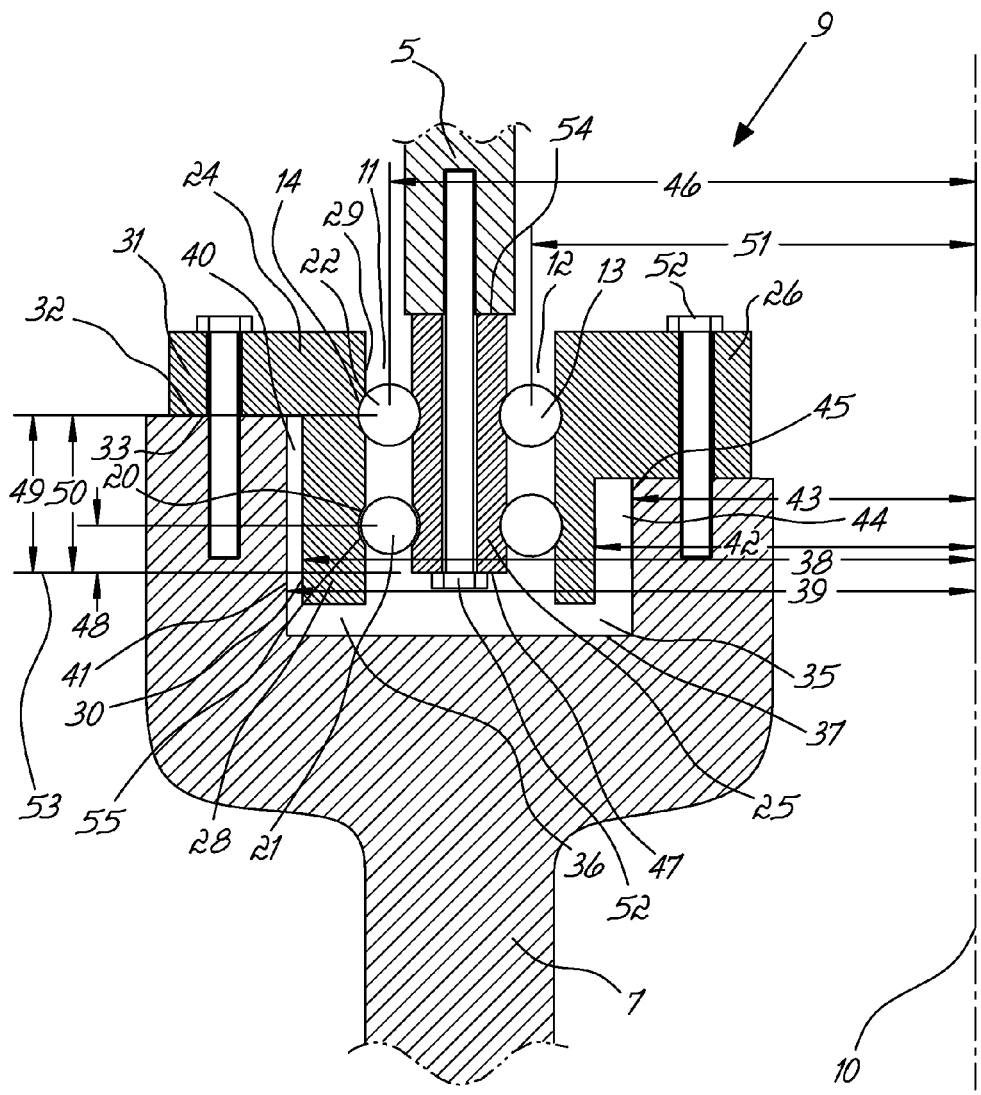
FIG. 6 illustrates a cross section of one side of a third embodiment of a pitch bearing comprising four rows of rolling elements and support parts arranged in a hub depression.

It should be noted that the pitch bearing axis of rotation 10 illustrated in FIGS. 5 and 6 is not shown in a realistic distance from the pitch bearing 9. It is very likely that the pitch bearing axis of rotation 10 would be considerably further away from the pitch bearing 9.

FIG. 5 illustrates a cross section of one side of a second embodiment of a pitch bearing 9 comprising four rows of rolling elements 13.

In this embodiment of the invention, the pitch bearing 9 comprises a first rolling element arrangement 11 arranged between the centre ring 25 and the outer ring 24 and comprising two separate rows 21, 22 of rolling elements 13, and a second rolling element arrangement 12 also comprising two rows of rolling elements 13.

In this embodiment of the invention, the first row of rolling elements 21 of the first rolling element arrangement 11 and the second rolling element arrangement 12 are made with greater play 8 than the second row of rolling elements 22 of the first rolling element arrangement 11 and the second rolling element arrangement 12.

In this embodiment of the invention, all the rolling elements 13 in all the rows 21, 22 are balls. But in another embodiment of the invention, some or all the rolling elements 13 could be rollers, needles or other members suitable for transferring loads substantially frictionless, or at least with very little friction, between the rings 24, 25, 26 of a pitch bearing 9.

Furthermore, in this embodiment of the invention, the rolling elements 13 in all the rows 21, 22 in the first rolling element arrangement 11 and the second rolling element arrangement 12 are of the same type. But in another embodiment, the rolling elements 13 in the first rows 21 could be different from the type of the rolling elements 13 in the second rows 22 or the first rows 21 and/or the second rows 22 could each comprise rolling elements 13 of different types. Or the rolling elements 13 in the rows 21, 22 in the first rolling element arrangement 11 could be different from type of rolling elements 13 in the rows 21, 22 of the second rolling element arrangement 12. Likewise, the size of the rolling elements 13 in the two first rows 21 could be different from each other and the size of the rolling elements 13 in the two second rows 22 could be different from each other.

In this embodiment of the invention, the increased play in the first row 21 compared to the second row 22 is achieved by making the balls of the first row 21 by another ISO tolerance than the balls of the second row 22. That is, if the races 14, 22 of both the first and the second row 21, 22 are the same nominal size and made with the same ISO tolerance, the balls could also be made at the same nominal size, but the balls of the first row 21 could be made to, for example, a f6 ISO tolerance, and the balls of the second row 22 could be made to, for example, a h6 ISO tolerance thereby allowing the first row 21 to have greater play than the second row 22. And visa-versa if the rolling elements 13 of both the rows 21, 22 were made at the same size and tolerance and only the tolerance of either the upper or the lower race 14, 22 was changed.

This principle also applies if the rolling elements 13 and the race 14 of the first row 21 were of a different nominal size than the rolling elements 13 and the race 22 of the second row 21. Then, a change in ISO tolerance class for at least one of the four elements (two rows of rolling element 13 and two races 14, 22) would entail a greater play in one of the rows 21, 22 compared to the other row 21, 22.

However, in another embodiment of the invention, the difference in play could be achieved by simply making the nominal size of the rolling elements 13 of the second row 22 greater than the nominal size of the rolling elements 13 of the first row 21 while forming their races 14, 22 substantially identically, or visa-versa.

FIG. 6 illustrates a cross section of one side of a third embodiment of a pitch bearing 9 comprising four rows of rolling elements 13 and support parts 28 arranged in a hub depression 35.

The outer ring 24 does in this embodiment of the invention comprise a support part 28 including a support face 29 which faces the centre ring 25. In this embodiment, the support face 29 is substantially parallel with the opposite and corresponding face of the centre ring 25. But in another embodiment, one or both faces could be sloped, curved or in another way provided with features making them none-parallel.

On the other side of the support part 28, the support part 28 is provided with a back face 30 facing away from the centre ring 25. In this embodiment of the invention, the support face 29 and the back face 30 are parallel besides for the two races in the support face 29, in which the rolling elements 13 of the first row 21 and the second row 22 runs, thereby providing the support part 28 with a substantial constant thickness in its entire axial extent. However, in another embodiment, the support face 29 or the back face 30 or both could be sloped, curved or in another way provided with features making the faces 29, 30 non-parallel.

In this embodiment, a contact surface part 31 protrudes from the back face 30 of the support part 28 in a direction away from the centre ring 25. An underside of the contact surface part 31, facing in a general axial direction towards the bottom surface plane 53, forms a contact face 32 which in this embodiment is fixed directly against a corresponding hub contact surface 33 by means of connection means 52. In this embodiment, both the contact face 32 and the hub contact surface 33 are even and level surfaces. In another embodiment, however, one or both of the surfaces 32, 33 could be sloped, curved or, for example, comprise matching protrusions and grooves, for example, to guide the bearing 9 or to centre the bearing 7 in relation to the hub 7 or blade 5.

In this embodiment of the invention, the contact face 32 is fixed directly against the hub contact surface 33, but in another embodiment, one or more washers, a distance piece, vibrations dampers or other could be provided between the contact face 32 and the hub contact surface 33. In any event, the connection means 52 would ensure that the contact face 32 is fixed towards the hub contact surface 33.

In this embodiment of the invention, the connection means 52, connecting the inner ring 26 and the outer ring 24 to the hub 7 and the centre ring 25 to the blade 5, are bolts. But in another embodiment of the invention the connection means 52 could be screws, rivets, stud bolts or any other kind of connectors suited for connecting pitch bearing rings 24, 25, 26 to wind turbine parts 5, 7.

The radial extent of the contact surface part 31 is so large that the entire outer ring 24 can be carried by the contact surface part 31 and all the connection means 52 can be arranged to penetrate only the contact surface part 31.

The contact surface parts 31 axial location on the back face 30 of the support part 28 may be pertinent in that the part of the support part 31 from which the contact surface part 31 protrudes will be considerably more rigid than the part of the support part 28 which is not supported by a support part 31. Thus, in the present embodiment, the upper part (i.e., the part furthest away from the rotor axis of rotation 6 and the bottom surface plane 53) of the support part 28 is considerably more rigid than the lower part.

The contact surface parts 31 is therefore positioned on the support part 28 so that the contact face 32 is further away from the rotor axis of rotation 6 and the bottom surface plane 53 than the first row of rolling elements 21. In this embodiment of the invention, the contact face 32 of the outer ring 24 is arranged almost level with the second row of rolling elements 22. However, the contact face 32 would only have to be arranged further away from the rotor axis of rotation 6 and the bottom surface plane 53 than the first row of rolling elements 21 to achieve aspects of the invention. However, preferably the contact face 32 should be arranged further away from the rotor axis of rotation 6 and the bottom surface plane 53 than a middle point between the first row of rolling elements 21 and the second row of rolling elements 22. But, it should also be noted that the further away from the first row of rolling elements 21 the contact face 32 is arranged, the more flexible the lower part of the support part 28 becomes and if this part becomes too flexible, the first row of rolling elements 21 will not be able to transfer as great a load as the second row of rolling elements 22. Accordingly, the load transferred through the bearing 9 will therefore be less advantageously distributed between the row of rolling elements 21, 22.

In this embodiment of the invention, the pitch bearing 9 is arranged so that the "free" end of the support parts 28 of the inner ring 26 and the outer ring 24 extends into a depression 35 in the hub 7. In this embodiment, the depression 35 is formed as a groove formed integrally with the hub 7, but in another embodiment, the inner wall 45 and the outer wall 41 of the depression could be formed by one or more separate parts.

In this embodiment, the outer diameter 38 of the support part 28 of the outer ring 24 is smaller than the outer diameter 39 of the depression 35, thereby forming an outer gap 40 between the support part 28 of the outer ring 24 and the outer wall 41 of the depression 35 so that the "free" end of the support part 28 of the outer ring 24 may deflect more freely in the depression 35.

Likewise, the inner diameter 43 of the depression 35 is smaller than the inner diameter 42 of the support part 28 of the inner ring 26, thereby forming an inner gap 44 between the support part 28 of the inner ring 26 and the inner wall 45 of the depression 35 so that the "free" end of the support part 28 of the inner ring 26 also may deflect more freely in the depression 35.

To even further ensure that the support parts 28 of the inner ring 26 and the outer ring 24 may deflect more freely in the depression 35, the depression 35 and the support parts 28 are so formed that deepest depth of the depression 35 is deeper than the greatest extent of the support parts 28 so a bottom gap 36 is formed between the bottom of the depression 35 and the support parts 28.

In this embodiment of the invention, the inner ring 26 is formed differently than the outer ring 24 in that the contact face 32 of the inner ring 26 is considerably closer to the rotor axis of rotation 6 and the bottom surface plane 53 than the contact face 32 of the outer ring 24. All things being equal, this would reduce the flexibility of the "free" end of the support part 28 considerably and to compensate for this reduced flexibility, the radial extent of the "free" end of the support part 28 is reduced considerably in relation to support part 28 of the outer bearing ring 24. Thus, to achieve an optimal load distribution between the two rows of rolling elements 21, 22, it is important that the axial location for contact face 32 in relation to the radial thickness of the support part 28 matches the given nominal load that the bearing 9 is subject to.

The invention has been exemplified above with reference to specific examples of designs and embodiments of wind turbines 1, wind turbine hubs 7 and pitch bearings 9. However, it should be understood that the invention is not limited to the particular examples described above but may be designed and altered in a multitude of varieties within the scope of the invention as specified in the claims.

What is claimed is:

1. A wind turbine, comprising:
   a rotor including at least one wind turbine blade connected to a rotor hub through at least one blade pitch bearing;
   said at least one pitch bearing comprising at least one outer ring, at least one center ring and at least one inner ring, and said at least one pitch bearing further comprising a first rolling element arrangement arranged between said at least one outer ring and said at least one center ring and a second rolling element arrangement arranged between said at least one center ring and said at least one inner ring, wherein at least one of said first and said second rolling element arrangements comprises at least two rows of rolling elements; and
   wherein said at least two rows of rolling elements are arranged at different axial positions in relation to an axis of rotation of said pitch bearing so that a first row of said at least two rows of rolling elements is arranged closer to the wind turbine part, to which said inner ring and said outer ring are connected, and a second row of said at least two rows of rolling elements is arranged closer to the wind turbine part to which said center ring is connected; and
   wherein the play of said rolling elements in said first row of rolling elements is greater than the play of said rolling elements in said second row of rolling elements.

2. The wind turbine according to claim 1, wherein a first row rolling element race at said first row is of the same size as a second row rolling element race at said second row and wherein said greater play is enabled by forming said rolling elements of said first row smaller than said rolling elements of said second row.

3. The wind turbine according to claim 1, wherein said rolling elements of said first row are of the same size as said rolling elements of said second row and wherein said greater play is enabled by forming a first row rolling element race at said first row greater than a second row rolling element race at said second row.

4. The wind turbine according to claim 1, wherein said rolling elements of said first row are smaller than said rolling elements of said second row and wherein a first row rolling element race at said first row is greater than a second row rolling element race at said second row.

5. The wind turbine according to claim 1, wherein said outer ring comprises an outer ring contact surface being fixed towards a corresponding outer ring hub contact surface of said hub and said inner ring comprises an inner ring contact surface being fixed towards a corresponding inner ring hub contact surface of said hub.

6. The wind turbine according to claim 1, wherein said center ring comprises a center ring contact surface being fixed towards a corresponding center ring blade contact surface of said blade.

7. The wind turbine according to claim 1, wherein said first rolling element arrangement is arranged further away from said axis of rotation of said pitch bearing than said second rolling element arrangement.

8. The wind turbine according to claim 1, wherein said at least one center ring comprises a bottom surface and a bottom surface plane, wherein said bottom surface plane is perpendicular to an axis of rotation of said pitch bearing and extending through said bottom surface, wherein said first row of said at least two separate rows of rolling elements is arranged at a first row distance from said bottom surface plane, and wherein said inner ring and/or said outer ring further comprises a support part including a support face substantially facing said center ring and including a back face substantially facing away from said center ring, wherein said at least two separate rows of rolling elements are supported against said support face and wherein a contact surface part protrudes from said back face, wherein said contact surface part includes a contact face substantially facing in a general axial direction towards said wind turbine part, to which said inner ring and said outer ring are connected, wherein said contact face is fixed towards a corresponding hub contact surface or a corresponding blade contact surface, and wherein said contact face is arranged at a contact face distance from said bottom surface plane and wherein said first row distance is smaller than said contact face distance.

9. The wind turbine according to claim 8, wherein said support part extends into a depression of said hub or said blade.

10. A pitch bearing for a wind turbine, comprising:
    at least one outer ring;
    at least one center ring including a bottom surface and a bottom surface plane, wherein said bottom surface plane is perpendicular to an axis of rotation of said pitch bearing and extending through said bottom surface; and
    at least one inner ring;
    said at least one pitch bearing further comprising a first rolling element arrangement arranged between said at least one outer ring and said at least one center ring and a second rolling element arrangement arranged between said at least one center ring and said at least one inner ring, wherein at least one of said first and said second rolling element arrangements comprises at least two rows of rolling elements; and
    wherein said at least two rows of rolling elements are arranged at different axial positions in relation to a axis of rotation of said pitch bearing, so that a first row of said at least two rows of rolling elements is arranged closer to said bottom surface plane than a second row of said at least two rows of rolling elements; and
    wherein the play of said rolling elements in said first row of rolling elements is greater than the play of said rolling elements in said second row of rolling elements.

11. The pitch bearing according to claim 10, wherein a first row rolling element race at said first row is of the same size as a second row rolling element race at said second row and wherein said greater play is enabled by forming said rolling elements of said first row smaller than said rolling elements of said second row.

12. The pitch bearing according to claim 10, wherein said rolling elements of said first row is of the same size as said rolling elements of said second row and wherein said greater play is enabled by forming a first row rolling element race at said first row greater than a second row rolling element race at said second row.

13. The pitch bearing according to claim 10, wherein said rolling elements of said first row is smaller than said rolling elements of said second row and wherein a first row rolling element race at said first row is greater than a second row rolling element race at said second row.

14. The pitch bearing according to claim 10, wherein said center ring comprises a center ring contact surface adapted for being fixed against a corresponding first wind turbine part and wherein said center ring contact surface is arranged at the end of said center ring in the general axial direction opposite said bottom surface plane, and wherein said inner ring comprises an inner ring contact surface adapted for being fixed against a corresponding second wind turbine part and wherein said outer ring comprises an outer ring contact surface also adapted for being fixed against said corresponding second wind turbine part and wherein said inner ring contact surface and said outer ring contact surface are arranged at the end of said rings in the general axial direction of said bottom surface plane.

15. The pitch bearing according claim 10, wherein said first row of said at least two separate rows of rolling elements is arranged at a first row distance from said bottom surface plane, and wherein said inner ring and/or said outer ring further comprises a support part including a support face substantially facing said center ring and including a back face substantially facing away from said center ring, wherein said at least two separate rows of rolling elements are supported against said support face and wherein a contact surface part protrudes from said back face, wherein said contact surface part includes a contact face substantially facing in a general axial direction towards bottom surface plane, wherein said contact face is arranged at a contact face distance from said bottom surface plane and wherein said first row distance is smaller than said contact face distance.

* * * * *